Feb. 17, 1931.   H. L. BRADLEY   1,793,435
MOLDING APPARATUS AND METHOD OF MOLDING ARTICLES
Filed July 21, 1923

INVENTOR.
Harry L. Bradley
BY
Edwin B H Tower, Jr.
ATTORNEY.

Patented Feb. 17, 1931

1,793,435

UNITED STATES PATENT OFFICE

HARRY L. BRADLEY, OF MILWAUKEE, WISCONSIN, ASSIGNOR, BY MESNE ASSIGNMENTS, TO RELIANCE COMPANY, OF WILMINGTON, DELAWARE, A CORPORATION OF DELAWARE

MOLDING APPARATUS AND METHOD OF MOLDING ARTICLES

Application filed July 21, 1923. Serial No. 653,016.

This invention relates to a method and apparatus for forming molded articles.

The articles to which the invention applies in particular are formed from moldable material which is granulated, powdered or otherwise divided.

The usual procedure is to compress the divided material by means of hydraulic or other high power presses, which are expensive to install and operate.

An object of the invention is to provide a method whereby such articles may be formed rapidly and economically.

Another object is to provide apparatus which will form such articles rapidly and economically.

Another object is to provide apparatus which is inexpensive to manufacture and operate.

Other objects and advantages will appear hereinafter.

According to the invention, the moldable material is placed in a die, the air is removed to a large extent from between the particles thereof by means of a low pressure, and then the material is subjected to a sudden high impact to compress the material into a firm and solid article.

According to another phase of the invention, a stem or the like is carried by the apparatus and firmly embedded in the article during the formation thereof.

A machine embodying the invention and an article made in accordance therewith are shown in the accompanying drawing in which the views are as follows.

Figure 1:
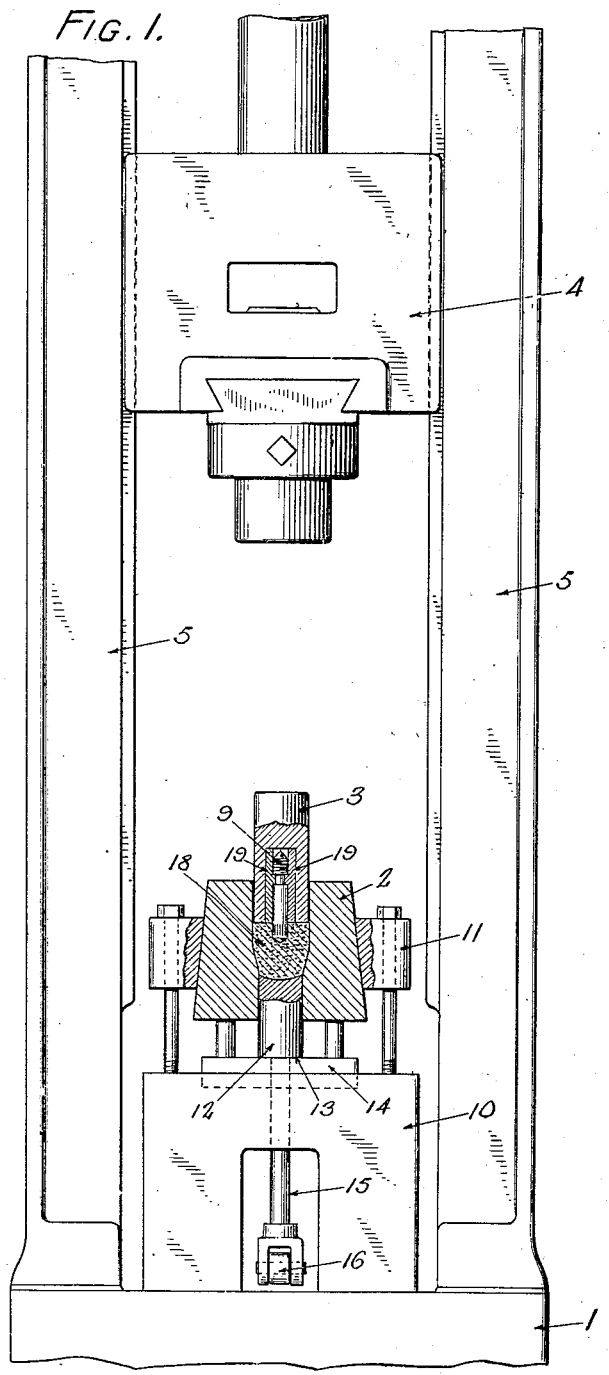
Fig. 1 is an elevation of the machine, partly in section and showing divided material in the mold ready to be compressed.
Figure 2:
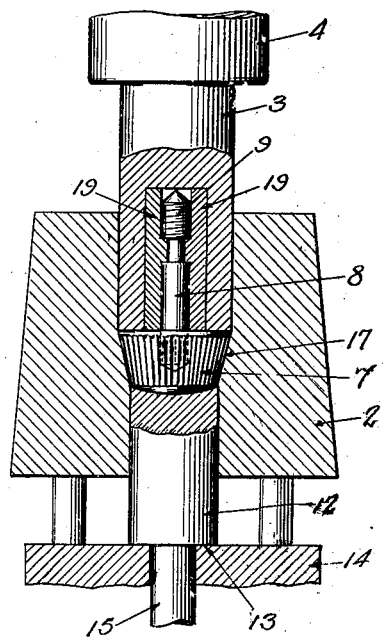
Fig. 2 is a vertical section through the mold showing a finished article therein.
Figure 3:
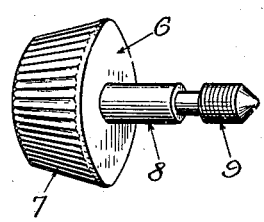
Fig. 3 is a perspective view of a finished article.

The article shown is an operating knob for rheostats and the like, but the invention is not limited to the maufacture of such knobs nor to the specific machine for making the same.

The machine 1 has a mold 2 into which a die 3 is driven by a weight or hammer 4 arranged between guides 5 which form the sides of the machine.

The mold 2 and the die 3 are adapted to form a frustro-conical rheostat knob 6 which has corrugations 7 formed in its periphery and a stem 8 embedded in its center and extending therefrom.

The stem 8 has threads 9 formed upon its outer end to engage corresponding threads in a rheostat and vary a pressure upon the resistor thereof as the knob 6 is turned.

The base of the machine supports an anvil 10 which has a clamping ring 11 bolted thereto for securing the mold 2 in position.

The clamping ring 11 surrounds the mold 2 and has a tapered inner surface which is complementary to the tapered outer surface of the mold 2.

The bottom of the mold 2 is closed by a plunger 12 having its lower part reduced in diameter to provide a shoulder 13 which normally rests upon a support 14 carried by the anvil 10 and supporting the mold 2.

When the clamping bolts are tightened, the clamping ring 11 is drawn toward the anvil 10 and fixes the mold 2 firmly in position upon the support 14 and the support 14 firmly in position upon the anvil 10.

The reduced part 15 of the plunger 12 extends downwardly through the anvil 10 and is connected to a crank 16 which may be operated to eject the finished article from the mold 2.

The mold adjacent the plunger 12, tapers upwardly slightly for a distance equal to the thickness of the knob and is provided with flutes or grooves 17, corresponding to the corrugations 7 of the knob.

From the top of the grooves or flutes 17, the wall of the mold extends vertically upward to provide a guideway for the die 3.

The die 3 through which the blow of the hammer is applied to the material is cylindrical and has a recess in the lower end thereof within which the stem 8 of the knob is clamped by a pair of semi-cylindrical shells 19.

The manner in which the knob 6 is formed is as follows:

The weight 4 is raised in any suitable manner and held suspended over the mold 2 while a charge 18 of divided material is placed into said mold. The stem 8 is then inserted in the die 3 and the die placed within the mold so that the end of the stem extends into the material to be molded.

The die 3 has considerable mass and the mere dropping of it into the mold will slightly compress the material therein and force out most of the air therefrom.

However, to insure the removal of the air, the material may be tamped slightly with the die 3.

The weight 4 is then released and falls upon the die 3 with great force, applying a high pressure practically instantaneously to the material within the mold and forming it into a firm solid article.

In practice, a hammer capable of delivering a blow of approximately 1,200 foot pounds has been found satisfactory for forming small knobs, but of course the intensity of the blow may be varied with articles of different size and material.

Material which has been found suitable for making articles such as above described is composed of pitch and asbestos, and divided into a powdered or other comminuted form, which may be readily handled and supplied to molds.

Any other suitable composition may be used, it being preferable to use a composition consisting of a filler and a binder which will flow when subjected to the impact of a hammer, so that the composition fills the entire mold and becomes bound together in a solid homogeneous mass.

This invention is, of course, susceptible of various modifications and adaptations within the scope of the appended claims.

What I claim is:

1. An apparatus, for forming molded articles from divided material, comprising a mold for containing the material, a die operating in said mold, and having means for holding an article to be partially embedded in the material to be molded, and means to provide a sudden impact on said die for compressing the material.

2. An apparatus for forming molded articles from divided material, comprising a mold into which the material to be molded is placed, a die having a recess in one end thereof to receive a pair of shells for holding a stem within said recess, and means for imparting pressure to said die, to thereby compress the material.

3. An apparatus for forming molded articles from divided material, comprising a base having upright guides and a mold supported therebetween, said mold having movable means forming the bottom thereof, for ejecting the molded article, a die operating in said mold having a recess in one end thereof and a plurality of shells formed to fit said recess, and a hammer slidably mounted on said guides to impart pressure to said die to compress the divided material.

4. An apparatus, for forming molded articles from divided material, comprising a mold, a die operating in said mold and having means for holding an article to be inserted in the material to be molded, a plunger operating in the opposite end of said mold and forming a bottom therefor and adapted to eject the finished article therefrom, and means for providing a sudden impact to said die for compressing the material.

5. An apparatus for forming molded articles comprising a frame, an anvil carried by said frame, a mold supported by said anvil, a die operating in said mold, and impact means slidable in said frame to impart a sudden high impact to said die to compress instantaneously the material in said mold into a homogeneous mass.

6. An apparatus for forming molded articles comprising a frame, an anvil carried by said frame, a mold supported by said anvil, a die operating in said mold and having means to hold an article to be partially embedded in the material to be molded, and impact means slidable in said frame to impart a sudden high impact to said die to compress instantaneously the material in said mold into a homogeneous mass.

7. The method of forming molded articles which consists in placing divided material into a mold, then applying means for allowing the air to escape therefrom, then inserting the die containing the stem of said article into said mold and applying a sudden impact upon said die for compressing the material, and finally ejecting the molded article from the mold.

8. A method of forming a molded article, comprising placing a quantity of moldable material in a mold, tamping said material to remove the air therefrom, corking the mold with a die to exclude the air therefrom, and then applying pressure to said die to compress said material.

9. A method of forming a molded article, comprising placing a quantity of moldable material in a mold, tamping said material to remove the air therefrom, corking the mold with a die to exclude the air therefrom, and then applying a sudden impact to said die to compress said material.

10. A method of forming a molded article, comprising placing a quantity of moldable material in a mold, tamping said material to remove the air therefrom with a die carrying a stem for said article, and then applying pressure to said die to compress said material and embed said stem.

In witnesss whereof, I have hereunto subscribed my name.

HARRY L. BRADLEY.